United States Patent [19]

Marazzi

[11] Patent Number: 4,798,164
[45] Date of Patent: Jan. 17, 1989

[54] APPARATUS FOR APPLYING GLAZE AS GRANULES TO TILES MAINTAINED AT A HIGH TEMPERATURE

[75] Inventor: Filippo Marazzi, Sassuolo, Italy

[73] Assignee: Ceramica Filippo Marazzi S.p.A.

[21] Appl. No.: 61,108

[22] Filed: Jun. 9, 1987

[30] Foreign Application Priority Data

Aug. 1, 1986 [IT] Italy ................ 21363 A/86

[51] Int. Cl.$^4$ ............................. B05C 19/00
[52] U.S. Cl. ................... 118/308; 118/60; 118/66; 118/612; 427/193; 222/271; 198/780; 239/659
[58] Field of Search ............. 118/308, 312, 24, 60, 118/66, 612; 427/193, 190, 188, 186; 222/271, 564; 198/780; 239/659

[56] References Cited

U.S. PATENT DOCUMENTS

| | | | |
|---|---|---|---|
| 870,569 | 11/1907 | Macdonald et al. | 118/308 X |
| 1,539,833 | 6/1925 | Fahrenwald | 198/780 X |
| 1,792,788 | 2/1931 | Wilde et al. | 118/610 |
| 1,923,773 | 8/1933 | Carpenter | 198/780 X |
| 2,151,737 | 3/1939 | Bryan | 239/657 |
| 2,661,303 | 12/1953 | Fasold et al. | 427/188 X |
| 3,049,436 | 8/1962 | Stewart et al. | 118/308 X |
| 3,132,964 | 5/1964 | Young | 427/188 |
| 3,283,740 | 11/1966 | Fredricksen | 118/308 X |
| 3,534,787 | 10/1970 | Heck | 118/308 X |
| 3,802,495 | 4/1974 | Hordis | 432/60 X |
| 3,807,546 | 4/1974 | Canonaco | 198/780 |
| 4,243,696 | 1/1981 | Toth | 118/308 X |
| 4,497,244 | 2/1985 | Koppens | 118/24 X |
| 4,561,380 | 12/1985 | Mulder et al. | 118/308 X |
| 4,583,486 | 4/1986 | Miller | 427/188 X |
| 4,655,161 | 4/1987 | Thompson | 118/308 X |

Primary Examiner—Shrive Beck
Assistant Examiner—Alain Bashore
Attorney, Agent, or Firm—Toren, McGeady & Associates

[57] ABSTRACT

An apparatus for applying glaze, in the form of granules, to hot tiles, having a dispenser including at least an inclined surface with a pouring edge for cascade or curtain coating of the glaze onto the hot tiles brought below it, preferably conveyed on rollers. Provision is preferably made for successive pouring edges aligned transversally to the tile conveyor system, and respective inclined surfaces, in particular, in the form of rotating wheels, which are internally traversed by cooling liquid.

13 Claims, 3 Drawing Sheets

APPARATUS FOR APPLYING GLAZE AS GRANULES TO TILES MAINTAINED AT A HIGH TEMPERATURE

BACKGROUND OF THE INVENTION

1. Field of the Invention

The subject invention relates to apparatus of applying glaze granules to tiles while the tiles are at a high temperature.

1. Description of Related Art

Processes for tile-making are known which provide for depositing granular glaze onto the tiles during their baking by heat treatment, i.e., when the tiles are at a high temperature. A process of such kind forms the subject matter of U.S. patent application Ser. No. 07/099,479 which is a divisional application of U.S. patent application Ser. No. 06/816,751 (now abandoned) which is based on Italian patent application No. 19589 A/85, in the name of the present applicant.

The application of the granular glaze onto the hot tiles entails numerous technological, physical and chemical problems, since account has to be taken of the fact that, in this process, tile temperature is propitiously higher than the melting temperature of at least some of the components of the glaze.

A glaze dispenser facing the tiles is subject to heating as a result of the heat transferred to it by the hot tiles, either by irradiation or by convection.

It might be supposed that this difficulty could be overcome by distancing the glaze dispensing unit from the tile, thus reducing the heat transferred to it by the tile. However, applicant has found that the increased fall height of the granular glaze gives rise to serious disadvantages.

In particular, if the fall height is excessive, the glaze becomes selectively subject to the action of the rising air-streams which occur in the presence of the hot tiles located within an environment of lower temperature; the granules of smaller size are clearly more likely to be slowed down by such rising air-streams, which effect a separation between the granules of different size. In addition, when the larger sized granules fall from a greater height, they acquire excessive kinetic energy which causes them to bounce off the surface of the tiles: as a result also of the rising air-stream, the separation of the small-sized fractions during the fall can cause uneven application due to a not perfectly constant and uniform fall of the glaze granules.

Moreover, the fact that the granules falling too fast tend to bounce off the tiles causes unevenness of application on the surface of the tile, especially proximal to the edges, and to the leading edge in particular, it follows that all these factors make it necessary for the fall height of the granular glaze to be kept as small as possible.

The spontaneous heating of the dispenser placed in close proximity to the incandescent tiles is therefore unacceptable, since the nearer the temperature of the dispenser comes to that of the tiles the more the lowest-melting fraction of the glaze is caused to melt, with the result that the melted glaze agglomerates in the dispenser and, in practice, prevents a correct dispensing of the glaze.

SUMMARY OF THE INVENTION

An object of the present invention is to solve the above problems by embodying a dispenser which applies the glaze with a low-height fall onto hot tiles, that is, tiles at temperatures higher than the melting temperatures of the glaze. This solution is based on the observation that the largest amount of heat transferred by the hot tile to the dispenser above it is irradiated heat.

It is known that heat exchange by irradiation is proportional to the difference between the fourth powers of the temperatures of the bodies between which the heat exchange takes place.

It has been experimentally demonstrated that cold glaze that falls onto the surface of the tiles drastically reduces irradiation, since the outer surface of the tile come to consist of the glaze itself which, in turn, absorbs heat from the surface layer of the tile. In particular, the rise in temperature of the glaze (with regard to which account has to be taken of the specific heat of the glaze and of the melting temperature of its melting component) clearly occurs with a resulting lowering of the temperature of the surface layer of the tile, there being borne in mind also the low heat transmission coefficient of ceramic bodies such as the support or substrate of a tile.

Thus, according to the invention, the glaze is poured as a cascade or curtain from at least a free edge of a cooled inclined surface, on which the granular glaze fed onto its surface can flow. The glaze is fed onto this inclined surface and, when it falls thereon, loses the kinetic energy that it may possess.

Advantageously, the free edge from which the glaze falls onto the tiles is disposed proximally to the perimetral area of the dispenser, which area is directionally placed so as to lie in the path of approach of the tiles proximal to the dispenser, so that the tiles pass below the body of the dispenser after having received at least part of the granular glaze. In particular, the dispenser comprises a plurality of edges from which the glaze falls, which are transversal to the tile after feed direction.

BRIEF DESCRIPTION OF THE DRAWINGS

The characteristics of the invention will become more apparent from an examination of the embodiments thereof described below, with reference to the appended drawings, in which.

DESCRIPTION OF THE PREFERRED EMBODIMENTS

Figure 1:
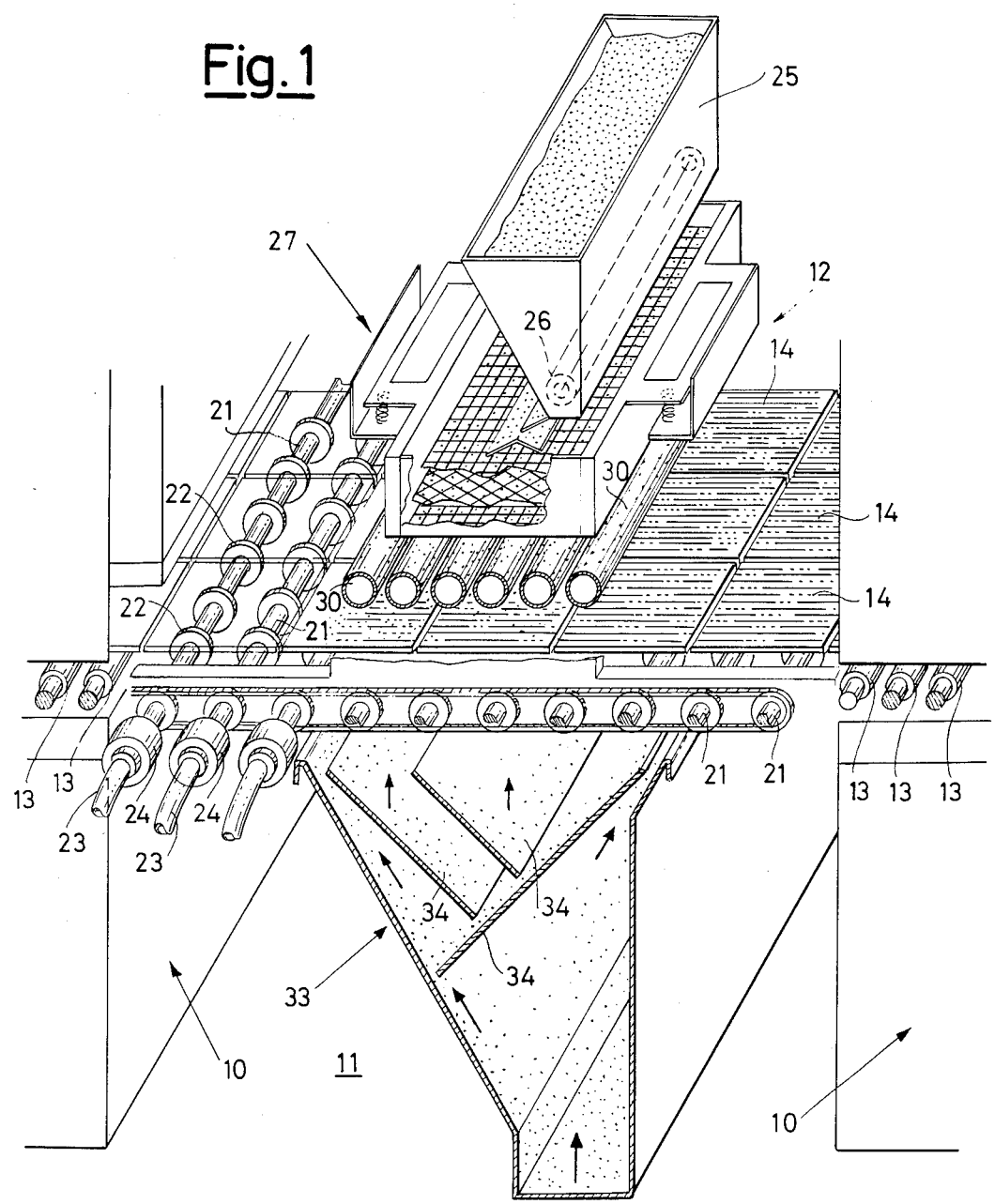
FIG. 1 is a diagrammatic, general prespective view of a preferred embodiment of the apparatus according to the invention.
Figure 2:
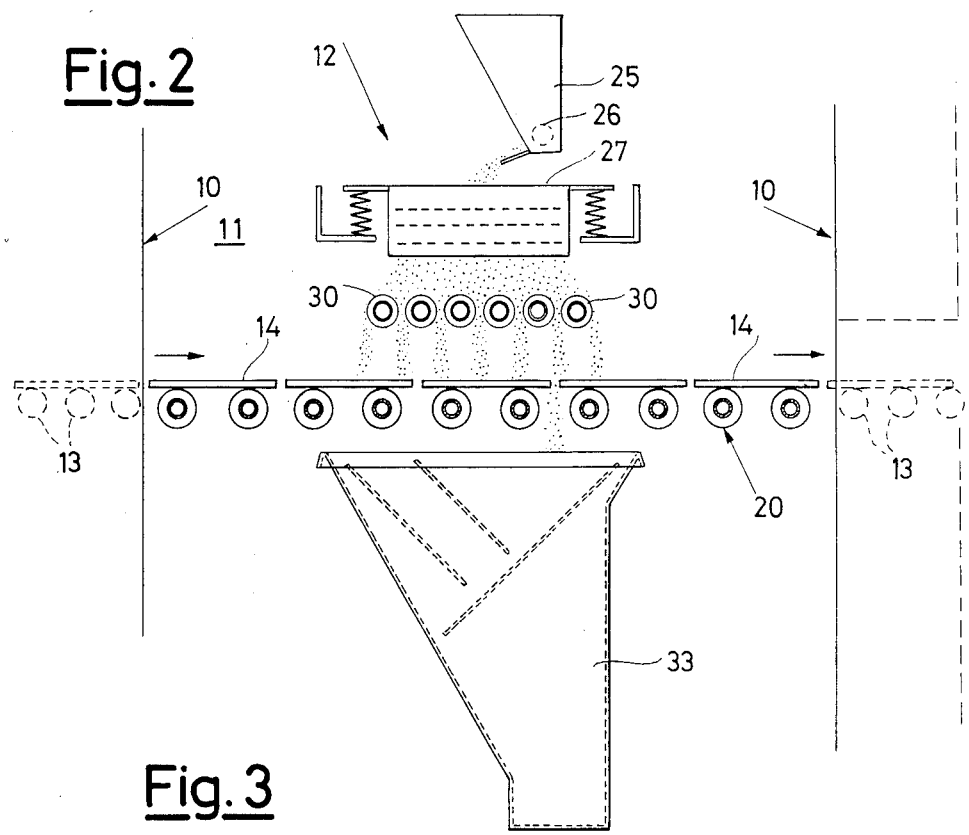
FIGS. 2 and 3 are, respectively, side and plan views of the apparatus in FIG. 1.
Figure 3:
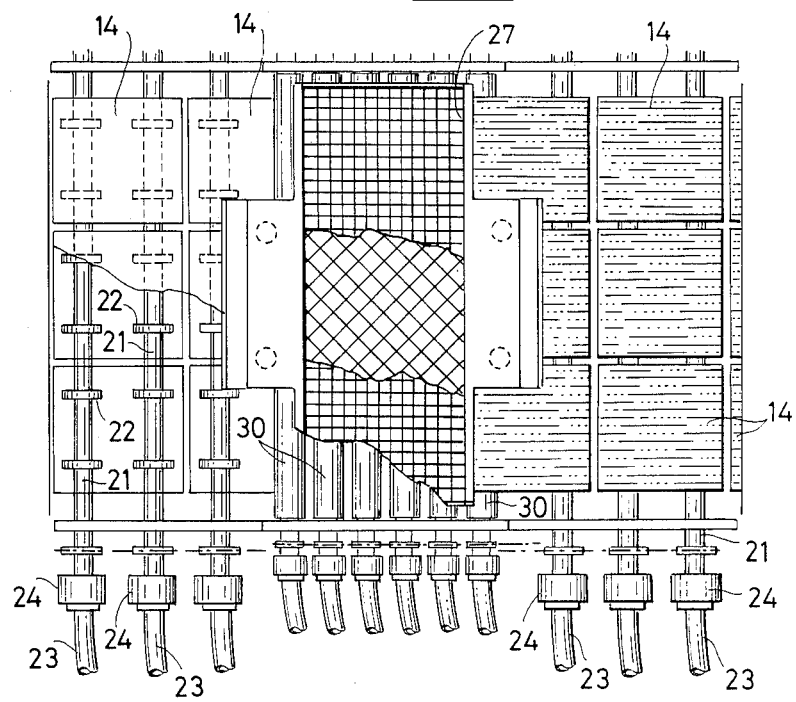

With reference to FIGS. 1 to 3, a diagrammatic illustration is shown of a furnace 10 in which is formed a gap 11 housing a dispenser device in accordance with the invention, indicated overall by 12.

The furnace 10 is a roller furnace which is per se conventional and therefore not described in detail; the numeral 13 diagrammatically indicates power-driven rollers which transport tiles 14 to within the furnace, wherein they are given the appropriate heat treatment, as is particularly explained in the Italian Patent Application No. 19589 A/85 in the name of the same applicant.

The dispenser 12 is provided with rollers 20 for conveying the tiles, which are an extension of the rollers 13 of the furnace 10.

The means employed for driving the rollers in rotation is not here shown in detail; it can be, for example, of the chain or gear type, as is usual in this kind of equipment.

Preferably, and as shown in the Figures, the rollers 20 have a discontinuous surface so that each tile 14 is supported by resting on discrete points.

This discontinuity can be advantageously obtained by embodying the rollers 20 with a central tubular part thereof 21 provided with annular projections 22, the tubular part 21 being traversed by cooling liquid, preferably water, fed to and taken off from the opposing ends thereof through pipes 23 and rotating joints 24, respectively (FIG. 3).

This configuration of the rollers 20 proves useful in preventing their heat deformation in the event of stoppage and subsequent restarting of the rollers bearing the hot tiles, since when the hot tiles 14 arriving from the furnace 10 come into contact with the rollers 20 which, if their movement is stopped, cool rapidly, touching the rollers proximally to a longitudinal portion thereof, the latter tend to undergo deformation and to form a convexity proximal to the generating line having the highest temperature. This deformation, which is the result of thermal disequilibrium, has no tendency to self-compensation and indeed in the first few minutes of operation tends to increase and thereafter gradually ceases. In effect, when the rollers 20 roll in order to convey the tiles, the hottest convex portion of them comes into contact with the tiles 14 and this tends to maintain the thermal disequilibrium between the different longitudinal areas of the rollers 20.

The designing of the rollers 20 so as to provide them with a discontinuous support surface prevents this thermal disequilibrium from arising and persisting, and it also sets a limit on the amount of heat transferred from the tiles 14, to the rollers 20 and makes it more possible to cool the latter without appreciably lowering the tile temperature. There has been seen to be particularly suited to maintaining thermal equilibrium of the rollers, an external surface consisting of annular ribs, which also fulfill the function of distributing the heat circumferentially.

The glaze dispenser 12 is provided with a hopper 25 for receiving the granular glaze, at the base of which a feed mechanism, consisting, for example, of a moving wheel 26 of a kind that prevents clogging of the mass, feeds the glaze onto an oscillating sieve 27.

From this sieve 27, the granular glaze falls onto a set of rotating wheels 30 disposed immediately above the surface of the tiles carried by the rollers 20. These rotating wheels 30 are also provided with cooling in the form of a fluid passing through them, in a manner entirely similar to that of the cooling of the rollers 20.

It should be noted that, when the glaze falls onto the rotating wheels 30, it is decelerated, thus reducing its kinetic energy by impact. This means that the height of the feeding mechanism 26 is not very critical, and the mechanism 26 can therefore be mounted at a convenient distance from the tiles 14 so as not to be subject to dangerous overheating, it again being recalled that the possibility of separation between the different glaze phases during the fall and the irregular accumulation of fine glaze fractions must be minimized. Account must also be taken of the fact that the rotating wheels 30 represent a screen against the radiant heat from the tiles.

Proximally to the rotating distributors wheels 30, below the rollers 20, there is provided a hopper 33 for collecting any glaze that passes through the line of side-by-side tiles brought close to the glaze dispenser 12. This hopper 33 should be constructed so as to reduce the occurrence of chimney effects due to the presence of the hot tiles, and, for this purpose, it is useful for the hopper 33 to have traversal partitions 34 and for the outlet mouth for the collected glaze be in seal with the extractor members.

A dispenser structure of this kind has been found to achieve the objects of this invention satisfactorily. Each of the rotating wheels 30 constitutes, in its upward-facing portion, an inclined double surface from which the glaze falls as a cascade or curtain onto the tiles, more specifically, from the edges which come to be formed by the generating lines of the rotating wheels tangential to the vertical planes.

The rotation of the rotating wheels 30 is not critical as regards the dispensing of the glaze, which they could dispense even if stationary. However, the rotation is extremely useful for continuously varying the portion of surface of the wheels 30 that is exposed to the radiant heat coming from the hot tiles. The wheels 30 thus becoming easier to cool, and the rotation also assures that no portion of the wheels 30 reaches temperatures that can trigger the glaze component melting phenomena and that there do not arise any differential expansions that can deform the wheels 30.

According to the invention, the first of the wheels 30 met by the tiles carried on the rollers 20 (from left to right in FIG. 1) is positioned so that it yields the glaze, by means of one of its edges, to the tiles 14 before they enter the area directly below the dispenser proper. As explained above, this first fall of glaze brings about a drastic diminution of the irradiation of the tiles, resulting in a lowering of the temperature of the tile surface layer, while not causing within the tiles any cooling of mass such as to cause significant thermal disequilibria and inner stresses leading to fissures in the finished tiles.

The wheels 30 complex is therefore subjected to a drastically lower irradiation than would be the case if the tiles travelled below them after not being cooled by the fall of the glaze. Moreover, the wheels 30 form a screen that protects the upper parts of the dispenser both from irradiation and convection.

The existence of a plurality of wheels 30 (rather than only one) allows the area of tiles screened off from them to be enlarged, although maintaining the relatively small diameter of the wheels and thus limiting the glaze fall height in accordance with the objects of the invention.

It has been found advantageous to dispense the glaze by fall from several successive edges, and thus also to improve the distribution over the tiles 14. The glaze falling from the first edge of the dispenser onto the hot tile immediately triggers a softening and melting phenomenon, with the result that the glaze falling from edges subsequently met by the tile in its travel has a lower tendency to bounce.

The tiles 14 carried from the furnace on the rollers 13 and then on the rollers 20, of necessity, have a certain longitudinal and transversal spacing between them, the glaze dispensed by the wheels 30 falling in the area of these spaces between tiles being collected by the lower hopper 33 and optionally recycled into the dispenser hopper 25.

The hopper 33 has screens 34 which form a labyrinth for the glaze, deviate the rising air-streams to outside the glaze application area proper, and can be appropriately cooled to subduct the heat received from the lower side of the tiles 14.

As a result of their being cooled and of the smallness of their contact-zones with the tiles 14, the rollers 20 can be maintained at a temperature distinctly lower than the melting temperature of the lowest-melting component of the glaze, thus preventing the glaze from adhering to the surfaces of the rollers 20.

As stated previously, the rotating wheel 30 configuration of the inclined surface for cascade or curtain pouring of the glaze onto the tiles 14 has been seen to be extremely advantageous for the variety of reasons set out hitherto.

Figure 4:
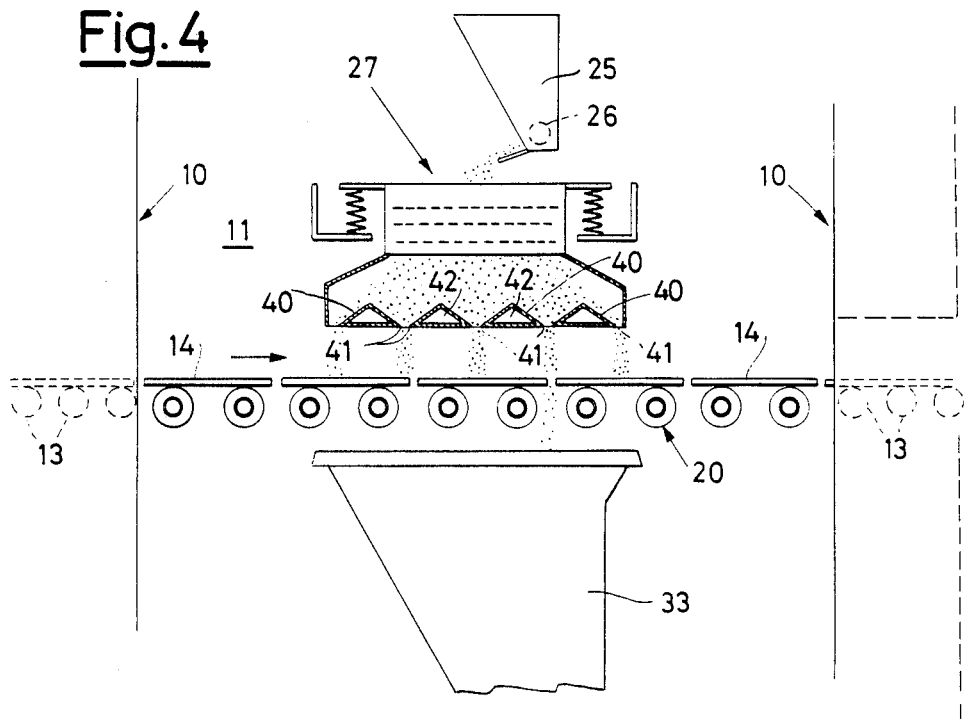
FIGS. 4 and 5 are partial views similar to those in FIG. 2, for different embodiments of the apparatus.
Figure 5:
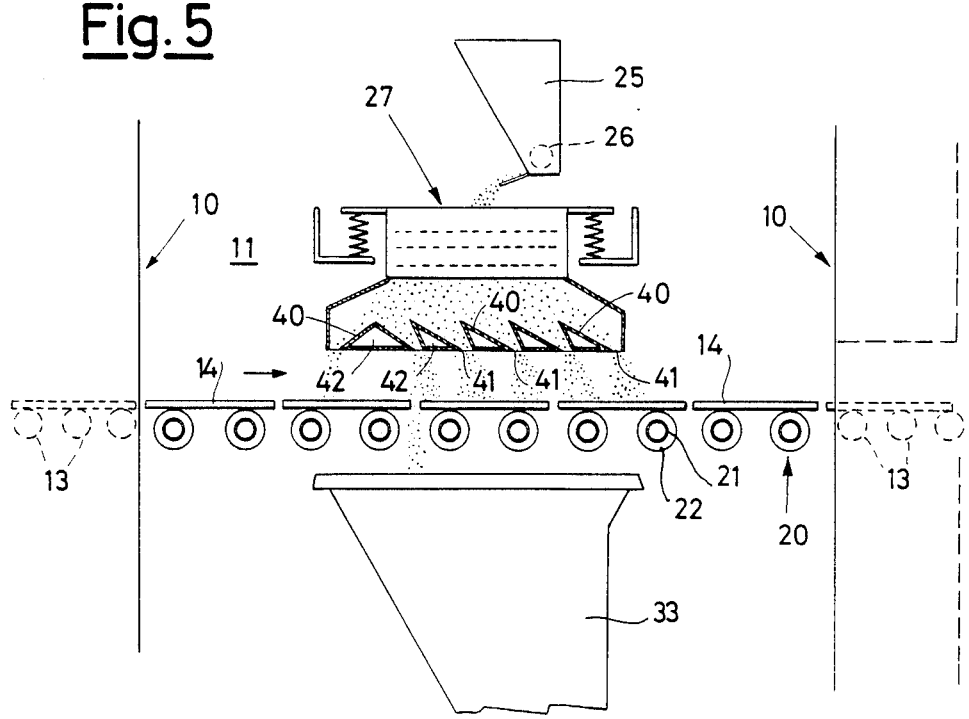

As shown in FIGS. 4 and 5, these wheels can, however, be substituted by surfaces 40 featuring edges 41 from which the glaze falls onto the tiles. The surfaces 40 are preferably formed with a hollow space 42 into which cooling liquid is force-circulated, as with the wheels 30.

The surfaces 40 need not necessarily be static. However, in the interests of a satisfactory distribution and freer flow of the glaze, they can be embodied in a vibrating form, for example, mounted solidly with the sieve 27.

It is also advantageous for the surfaces 40 to number more than one, in order to obtain a gradual, progressive distribution of the glaze over the tiles 14, and a better evenness of the layer.

In particular, FIG. 5 shows a first surface 40 toward the tile feed side so that the tiles arrive below the dispenser already coated with glaze, in accordance with what has been explained above. The other surfaces 40, however, are shown facing in the opposite direction, wherein, it has been found that it is advantageous, as regards a more uniform covering of the front and rear sides, for the glaze granules to have a horizontal component in their fall trajectory, parallel to tile feed and in the same direction.

Numerous alterations of the structure herein disclosed will suggest themselves to those skilled in the art. However, it is to be understood that the present embodiments of the invention are for purposes of illustration only and not to be construed as a limitation of the invention. All such modifications which do not depart from the spirit of the invention are intended to be included within the scope of the appended claims.

I claim:

1. An apparatus, for applying glaze in granular form to tiles maintained at a high temperature, comprising a tile conveyance system above which is a glaze dispenser unit, wherein the dispenser unit comprises at least an elongated glaze pouring edge which extends proximal to, and in a manner substantially transversal to, a path along which the tiles travel and which includes a terminal edge of an inclined surface, and means for depositing glaze on said inclined surface, the inclined surface comprising a forced-circulation cooling system which is located between the conveyance system and the dispenser unit so that the glaze when in said glaze dispenser unit is unaffected by said high temperature.

2. An apparatus as claimed in claim 1, wherein the said glaze pouring edge extends substantially proximally to a periphery of the dispenser unit, which periphery faces the tiles in their approach toward the dispenser unit.

3. An apparatus as claimed in claim 1, wherein the said dispenser unit has a plurality of terminal parallel edges of respective inclined surfaces.

4. An apparatus as claimed in claim 1, wherein said inclined surface comprises a hollow body within which cooling liquid is caused to circulate by said cooling system.

5. An apparatus as claimed in claim 3, wherein the said inclined surfaces comprise upward-facing portions of cylinders mounted with horizontal axes and said glaze pouring edges consist of the areas of the dispenser cylinders adjacent to vertical planes tangent to said cylinders.

6. An apparatus as claimed in claim 5, further comprising means for rotating said cylinders.

7. An apparatus as claimed in claim 5, wherein said cylinders are hollow and are traversed internally by cooling liquid.

8. An apparatus as claimed in claim 1, wherein said tile conveyance system is a roller system, each roller therein having an external surface featuring discontinuous projections for supporting the tiles at a number of discrete points.

9. An apparatus as claimed in claimed in claim 8, wherein said discontinuities consist of annular bodies mounted coaxially on a shaft.

10. An apparatus as claimed in claim 9, wherein said shaft is hollow to be traversed by a cooling liquid.

11. An apparatus as claimed in claim 1, further comprising, below the tile conveyance system, means for collecting the granular glaze that overreaches edges of the tiles.

12. An apparatus as claimed in claim 11, wherein said glaze collecting means consists of a hopper having glaze deviation partitions.

13. An apparatus as claimed in claim 1, wherein said means for depositing the glaze onto said inclined surfaces comprises a vibrating sieve.

* * * * *